(12) United States Patent
Cantu

(10) Patent No.: US 7,690,294 B2
(45) Date of Patent: Apr. 6, 2010

(54) COOKING AND SERVING SYSTEM AND METHODS

(76) Inventor: Homaro R. Cantu, 3829 N. Tripp, Chicago, IL (US) 60641

( * ) Notice: Subject to any disclaimer, the term of this patent is extended or adjusted under 35 U.S.C. 154(b) by 210 days.

(21) Appl. No.: 11/713,575

(22) Filed: Mar. 2, 2007

(65) Prior Publication Data

US 2007/0246037 A1    Oct. 25, 2007

Related U.S. Application Data

(63) Continuation-in-part of application No. 11/118,955, filed on Apr. 29, 2005.

(60) Provisional application No. 60/566,779, filed on Apr. 30, 2004.

(51) Int. Cl.
*A47J 37/08* (2006.01)
*A47G 23/04* (2006.01)

(52) U.S. Cl. .......................... 99/401; 99/339; 126/246; 126/400; 126/375; 126/236.01; 219/730; 219/734; 219/620; 219/622; 219/624; 219/647; 219/663; 219/649; 219/759; 219/625; 219/626; 219/634; 220/215; 220/574.2

(58) Field of Classification Search ................. 219/730, 219/734, 620–22, 624, 647, 663, 649, 759, 219/625–6, 634, 665; 99/339, 401; 126/246, 126/236.01, 400, 375; 206/545; 220/215, 220/574.2
See application file for complete search history.

(56) References Cited

U.S. PATENT DOCUMENTS

| 777,104 A | 12/1904 | Kahn |
|---|---|---|
| 790,612 A | 5/1905 | Boniface |
| 804,090 A | 11/1905 | Boeck |
| 804,184 A | 11/1905 | Boeck |
| 920,719 A | 5/1909 | Blasberg |
| 930,204 A | 8/1909 | Marsh et al. |
| 966,579 A | 8/1910 | Myers |
| 1,034,268 A | 7/1912 | McCord |
| 1,049,385 A | 1/1913 | Mohrenwitz |
| 1,155,519 A | 10/1915 | Shapland |
| 1,275,222 A | 8/1918 | Chamberlen |
| 1,377,092 A | 5/1921 | Phaneuf |
| 1,412,717 A | 4/1922 | Stowell |
| 1,630,237 A | 5/1927 | Smith |
| 1,948,778 A | 2/1934 | Zoia |
| 1,969,614 A | 8/1934 | Klopfenstein |
| 2,218,974 A | 10/1940 | Platt |
| 2,434,166 A | 1/1948 | Klumpp |
| 2,505,117 A | 4/1950 | Hoffman |
| 2,582,735 A | 1/1952 | Alaj |
| 2,767,297 A | 10/1956 | Benson |
| 2,864,932 A | 12/1958 | Forrer |
| 3,019,783 A | 2/1962 | Clarke |
| 3,098,924 A | 7/1963 | Salton et al. |
| 3,148,676 A | 9/1964 | Truog et al. |
| 3,830,148 A | 8/1974 | Shevlin |
| 3,875,370 A | 4/1975 | Williams |

(Continued)

Primary Examiner—Shawntina Fuqua
(74) Attorney, Agent, or Firm—Valauskas & Pine LLC

(57) ABSTRACT

An improved system and methods useful for the cooking of one or more food items by the application of a non-ambient temperature developed within a temperature retentive element. The temperature retentive element can be sized and shaped to form a cooking box in which cooking at a temperature relative to the non-ambient temperature may proceed and from which the food item, when fully cooked, may be served.

3 Claims, 11 Drawing Sheets

U.S. PATENT DOCUMENTS

| | | | |
|---|---|---|---|
| 4,120,981 A | 10/1978 | Burkhart | |
| 4,138,504 A | 2/1979 | Mack et al. | |
| 4,154,861 A | 5/1979 | Smith | |
| 4,164,643 A | 8/1979 | Peart et al. | |
| 4,182,405 A | 1/1980 | Hysen et al. | |
| 4,198,559 A | 4/1980 | Walter et al. | |
| 4,235,282 A | 11/1980 | de Filippis et al. | |
| 4,258,695 A | 3/1981 | McCarton et al. | |
| 4,455,319 A | 6/1984 | Clark | |
| 4,530,344 A | 7/1985 | Iyengar et al. | |
| D281,214 S | 11/1985 | Schaller | |
| 4,675,507 A | 6/1987 | Akiyoshi et al. | |
| 4,880,952 A | 11/1989 | Hirai et al. | |
| 4,982,722 A | 1/1991 | Wyatt | |
| 5,052,369 A * | 10/1991 | Johnson | 126/400 |
| 5,064,055 A | 11/1991 | Bessenbach et al. | |
| 5,125,391 A | 6/1992 | Srivastava et al. | |
| D328,404 S | 8/1992 | Small | |
| D347,548 S | 6/1994 | Boehm et al. | |
| 5,375,511 A | 12/1994 | Huie et al. | |
| 5,453,287 A | 9/1995 | Close | |
| D363,879 S | 11/1995 | Krupa et al. | |
| D367,203 S | 2/1996 | Sprouls | |
| 5,520,103 A | 5/1996 | Zielinski et al. | |
| 5,603,858 A | 2/1997 | Wyatt et al. | |
| 5,611,328 A | 3/1997 | McDermott | |
| D393,204 S | 4/1998 | Goins et al. | |
| 5,786,643 A | 7/1998 | Wyatt et al. | |
| 5,884,006 A | 3/1999 | Frohlich et al. | |
| 5,901,699 A | 5/1999 | McDermott | |
| 5,904,264 A | 5/1999 | Yamada et al. | |
| D410,840 S | 6/1999 | Wyslotsky et al. | |
| 5,916,470 A | 6/1999 | Besser et al. | |
| 5,921,229 A | 7/1999 | Blake | |
| 5,954,984 A | 9/1999 | Ablah et al. | |
| 6,036,801 A | 3/2000 | Yamada et al. | |
| 6,108,489 A | 8/2000 | Frohlich et al. | |
| 6,147,337 A | 11/2000 | Besser et al. | |
| 6,187,348 B1 | 2/2001 | Polster | |
| 6,188,053 B1 | 2/2001 | Wyatt | |
| D439,160 S | 3/2001 | Abayhan et al. | |
| 6,197,359 B1 | 3/2001 | Llorente Hompanera | |
| 6,262,396 B1 | 7/2001 | Witt et al. | |
| 6,263,785 B1 | 7/2001 | Zittel | |
| 6,272,976 B1 | 8/2001 | Berryman | |
| 6,350,972 B1 | 2/2002 | Wright et al. | |
| 6,384,381 B2 | 5/2002 | Witt et al. | |
| 6,467,645 B2 | 10/2002 | Park | |
| 6,545,251 B2 | 4/2003 | Allera et al. | |
| 6,582,743 B2 | 6/2003 | Cai | |
| 6,599,452 B1 | 7/2003 | Ferguson | |
| 6,647,865 B2 | 11/2003 | Holl | |
| 6,670,589 B2 | 12/2003 | Wyatt | |
| 6,698,336 B1 | 3/2004 | Siegel et al. | |
| 2001/0043977 A1 | 11/2001 | Llorente Hopanera | |
| 2002/0096509 A1 | 7/2002 | Von Mosshaim | |
| 2002/0166461 A1 | 11/2002 | Johnson | |
| 2003/0047553 A1 | 3/2003 | Patti et al. | |
| 2004/0020915 A1 | 2/2004 | Shei | |
| 2004/0035845 A1 | 2/2004 | Moon et al. | |

\* cited by examiner

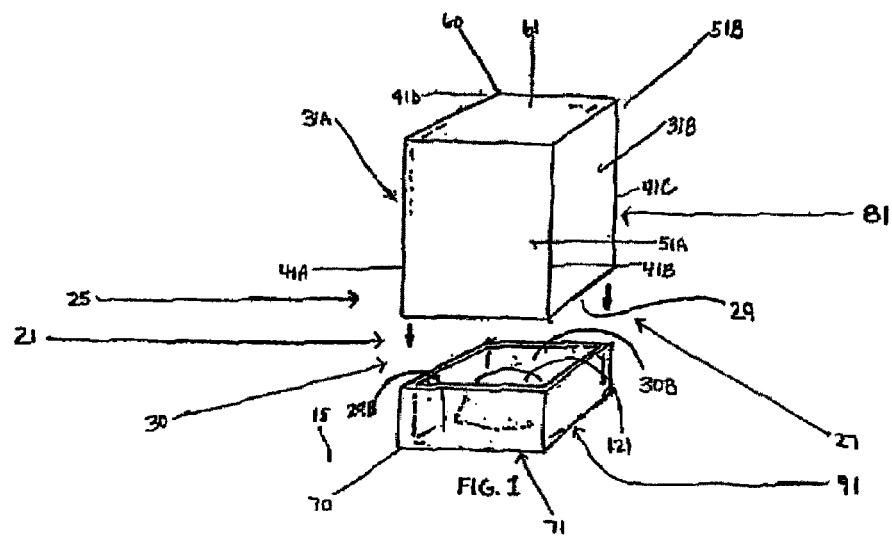
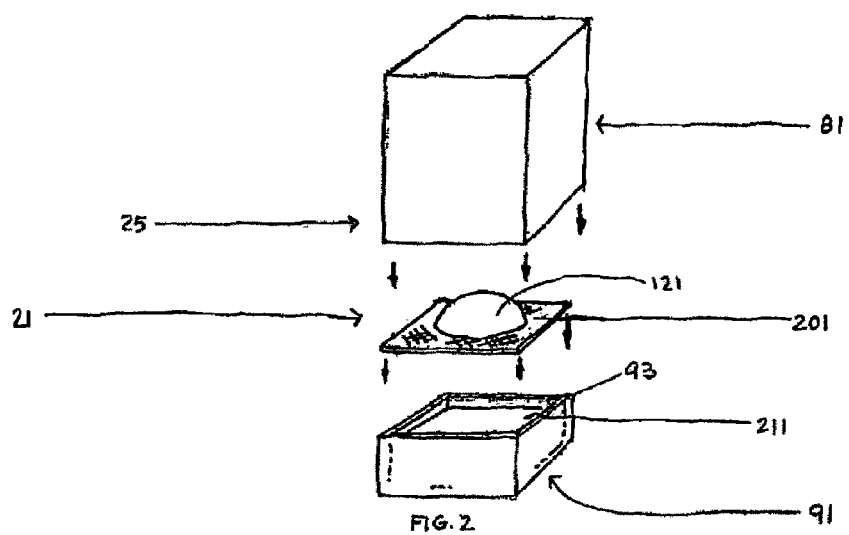

COOKING AND SERVING SYSTEM AND METHODS

This application is a Continuation-in-part of U.S. patent application Ser. No. 11/118,955, filed Apr. 29, 2005 which claimed the benefit of U.S. Provisional Application No. 60/566,779 filed Apr. 30, 2004.

FIELD OF THE INVENTION

The present invention generally relates to a system and methods by which a food item may be prepared such as through cooking. More specifically, the present invention is directed to a system and methods using a temperature retentive element from which a simplified container may be formed through the use of which food items may be prepared.

BACKGROUND OF THE INVENTION

There are many devices with and methods by which a food item may be prepared. Some of these devices and methods are directed to cooking a food through the use of an appliance in which a source of power and a supply mechanism is used to produce heat from internal heating elements. Other devices have no internal heating elements by which food may be cooked. These devices—for example, pots, pans, sheets, and molds and commonly known as cookware—are constructed for use within or on a source of heat in order to prepare a food item. Conventionally, cookware can transfer heat from an external heat source efficiently to the food item. Conventional cookware can be difficult to use. The cookware may retain heat and continue to cook the food even though the cookware is removed from the heat source leading to difficult to predict results and possible undercooking, or generally uneven consequences.

There are many other devices and methods by which a food item may be kept warm for a period of time. Some of these devices permit the food to be kept warm and served. To satisfy their function as service items, many of these devices are covered decorative containers having lids or domes. To permit the food to be kept warm for a longer period of time, certain food service devices includes a separate heating element or heat storage medium that is positioned within or adjacent to covered or domed walls of the container in which the food is retained, and from which the generated or retained heat is dissipated.

Appliances by which food may be both cooked and served are known. These cooking/serving devices, like many other known cooking and serving devices, are typically complex, multi-element units having at times power supply means and circuitry for the operation of the cooking element and that, accordingly, are time consuming to manufacture and costly and require added time to use and clean up. Conventional cooking/serving equipment, as a whole, is also not structured to withstand a great amount of heat such as that which may be generated within a restaurant oven. Such heat may melt components of the appliances such as plastic handles or coated wires. Furthermore, the heat retained within these conventional cooking/servicing devices is typically insufficient to cook a wide range of food items, such as those that are typically considered to be "main courses", for example such as a cut of meat or a filet of fish other than through known "slow cooking" methods.

As a group, known cooking devices are typically not designed to facilitate easy clean up of both the cooking surface and the external decorative surface. Known cooking devices, serving devices, and cooking/serving devices are not of a uniform shape and size to permit the devices to be stored efficiently side by side and/or stacked.

A demand therefore exists for a system and methods utilizing a simplified apparatus by which food may be cooked and served through the application of non-ambient heating of the entire apparatus. The present invention satisfies the demand.

SUMMARY OF THE INVENTION

The present invention is directed to systems and methods that use a simplified container having a retentive element for retaining the temperature of the environment to which the container is subjected prior to the cooking and serving with the container. Accordingly, an item or items may be cooked in a place remote from a source of power including electric or gas power.

The present invention in one of its simplest embodiments is a retentive element sized and shaped into a wall that is openable and having an internal surface forming a cavity in which a food item or items are placed for cooking. For purposes of this application, the term "cooking" is defined as the preparation of food by the application of a temperature higher than ambient temperature heat (to which the terms "heat", "heating", or "heated" shall also apply herein) or by the application of a temperature lower than ambient temperature (to which the terms "cold", "cooling", "chill", "chilling", "frozen", or "freezing" shall also apply herein). The term "remote" means separate and apart from a conventional heating source —such as an oven, stove, or cook top—or from a conventional cooling source—such as a refrigerator or freezer. The retentive element is preferably formed from a material that retains non-ambient temperature for a generally predictable length of time that is, at least, sufficient to permit the cooking to take place. In its simplest form, the box does not include means for accepting and distributing power—such as electric or gas—to produce a temperature at which a food can be cooked such as with heat or cold.

One preferred material from which the retentive element may be formed is two-component silicones. One such group of suitable silicones are those that are known as tin-catalysed silicones. Another group of suitable silicones are those that are known as platinum-catalysed silicones. A source of such silicones is Eager Plastics, Inc. of Chicago, Ill.

One embodiment of the cooking/serving box is formed from a retentive element sized and shaped to produce a wall of simplified construction. The composition and the structure of the retentive element and the cooking/serving box advantageously permits the entire box to be subjected to a wide range of temperatures—including those temperatures produced in a typical restaurant oven and those produced in a typical refrigeration or freezer unit. The retentive element advantageously retains the externally applied temperature. Because of the simplified uniformity of the box, internal temperatures can be produced within the box that are generally known relative to the external temperature.

An embodiment of the cooking/serving box (also known as "cooking box" or simply "box" herein) includes a simplified, uniform internal shape. Such a generally uniform internal shape advantageously permits a generally uniformally-dispersed temperature environment to be developed within the box. The retentive element is of a composition and construction so that a desired non-ambient temperature may be applied externally to the box formed from the retentive element and a generally known corresponding temperature will be produced within the box that is retainable for a generally known period of time. Such a uniformally-dispersed internal temperature environment subjects the food item within the box to a generally uniform temperature, thereby permitting the temperature in the foot item carried in the box to be changed in a generally known manner.

Embodiments of the cooking box can include a generally uniform external shape. Such a shape is advantageous in that it permits the walls be exposed uniformally to a externally applied non-ambient temperature and, thereby, can facilitate the development of generally uniform internal temperatures.

Because the temperatures which are generated within the box can be generally known from the composition and configuration of the retentive element, cooking can proceed in a generally known manner, the term "planned cooking" for purposes of this application will mean cooking in a generally known manner and for a generally known length of time and is distinguishable from cooking in which how the preparation of a food item is largely guesswork and may require extensive checking of the progress of the cooking process.

The retentive element may be formed further from a material that can be structured and shaped to permit a box—to which a desired external temperature has been applied—to be served with the uncooked foot item within the box for the cooking to proceed at the serving site. For purposes of this application, the terms "serving", "service", or "served" concern the delivery of the cooking/serving box to a cooking site at which the cooking of the food will proceed. One embodiment of the cooking/serving box that facilitates the serving includes a wall that is generally closeable so that planned cooking can occur at the site of service. "Planned cooking" means such preparation of food in a generally predictable manner and in generally known temperature ranges. An embodiment of the box including such a generally closeable wall is further advantageous in that it permits that form of cooking in which higher temperatures to be applied to the food item with the box to take place without cooking by-products to be discharged unintentionally.

Cooking/serving boxes formed from a retentive element having other shapes and sizes and elements can provide additional advantages. For example, a cooking/serving box formed from a retentive material having a spherical external shape permits non-ambient temperature applied to the external surface of the box to develop uniform corresponding non-ambient temperatures within the box.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings provided to illustrate and not to the limit the invention, where like designations denoted like elements, and in which.

DESCRIPTION OF PREFERRED EMBODIMENTS

A temperature retentive element—which may be shaped to form a box for the cooking and serving of a food item according to the system and methods of the present invention—is identified in the accompanying drawings as 21. For convenience of description, terms such as "upper", "lower", "outer", "inner", "horizontal", "vertical" "outwardly", and "inwardly" are used to refer to the box 25 in an orientation illustrated in the accompanying drawings. However, it will be understood that embodiments formed for the temperature retentive element 21 advantageously can be used in a variety of orientations.

Figure 1:
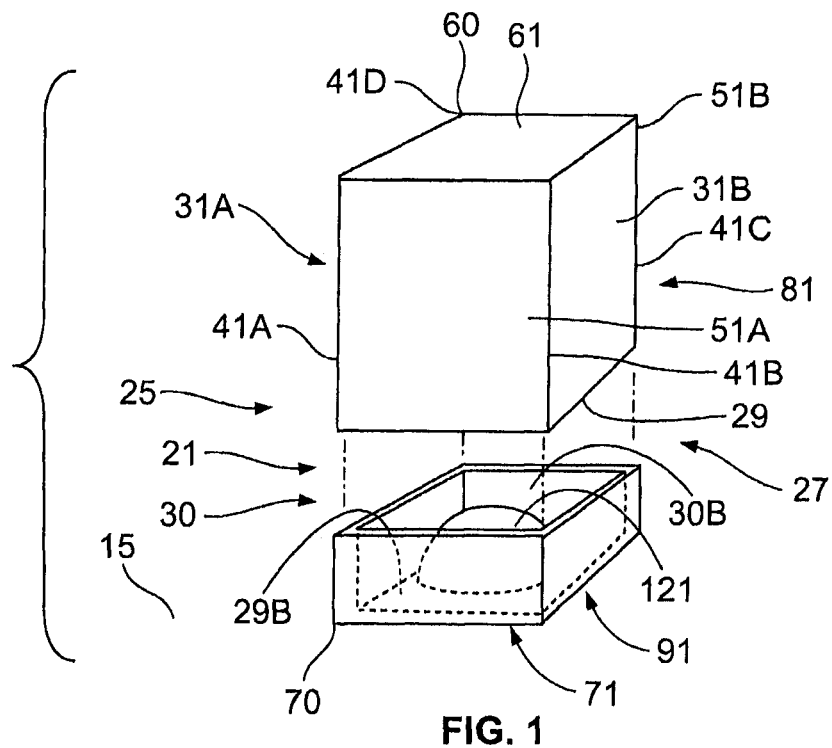
FIG. 1 is a perspective view of one embodiment of a cooking box according to the present invention providing a simplified construction and generally uniform shape to facilitate planned cooking.

FIG. 1 shows one embodiment of a temperature retentive element 21 according to the present invention. FIG. 1 shows a perspective view of a temperature retentive element 21 sized and shaped to form a rectangular shaped box 25 having an outer surface 27 and inner surface 29. The inner surface 29 of the FIG. 1 embodiment is sized and shaped to define a cavity 30 within which a food item 121 may be received and cooked. For purposes of this application, unless specifically stated otherwise, the term "food item" means the one item or more than one item for that is subjected to cooking and/or is cooked.

More specifically, the embodiment illustrated in FIG. 1 of the temperature retentive element 21 is sized and shaped to form a wall 26 configured as opposing sets of vertical side walls 31A, 31B and 51A, 51B—joined at side wall edges 41A, 41B, 41C, and 41D—and opposing top wall 61 and bottom wall 71, the former of which is joined to the vertical side walls 31A, 31B, 51A, 51B and side wall edges 41A, 41B, 41C, and 41D at the top edge 60, and the latter of which is joined to the same walls 31A, 31B, 51A, 51B and edges 41A, 41B, 41C, and 41D along bottom edge 70. The side walls 31A, 31B, 51A, 51B and edges 41A, 41B, 41C, and 41D of the FIG. 1 embodiment are sectioned to provide an upper box portion 81 opposing a lower box portion 91.

While the retentive element 21 in the FIG. 1 embodiment and other embodiments may be sized and shaped so that a single food item can be cooked within the box 25, the retentive element 21 may be configured to permit multiple food items to be cooked simultaneously with the box 25.

Upper portion 81, as the lower portion 91, can be sized and shaped to facilitate the development of a known temperature with the box 25. The retentive element 21 of the portions 81, 91 may also be sized and shaped to facilitate the lifting, transport, and/or service of the box 25. The embodiment of the box 25 shown in FIG. 1 is sized and shaped so that an individual may lift the upper portion 81.

In the illustrated embodiment, the upper portion 81 mates with the lower portion 91 to provide a generally continuous outer surface 27 and inner surface 29, and thereby a generally continuous wall 26. A box 25 having such generally continuous wall 26 and continuous surfaces 27, 29 is advantageous in that the cooking that occurs inside the box 25 can be generally isolated from the exterior environment. Furthermore, in these embodiments in which the retentive element 21 is clear, transparent, or semi-opaque, diner or diners may view the cooking that is taking place within the box 25 without coming into direct contact with the by-products of the cooking process—for example, noise, spatterings, or, in certain cases, what a diner or diners may consider to be cooking odors or fumes.

The outer surface 27 of the bottom 71 is sized and shaped and textured to permit the box 25 to rest on a serving site 15 to permit planned cooking within the box 25 to occur.

In the embodiment of the box 25 shown in FIG. 1, the temperature retentive element 21 is sized and shaped to provide an inner surface 29 which includes a lower inner surface portion 29B that defines a cavity portion 30B at least within the lower box portion 91 that is sized and shaped to accommodate a food item 121 therein. While the food item 121 may rest on the lower inner surface portion 29B of the bottom wall 71, the food item 121 may also be spaced from or supported so that it is not in direct contact with the inner portion 29B of the bottom wall 71.

The retentive element 21 of the present invention may be sized and shaped to provide or to accept a separate preparation surface 201 on which the food item 121 may be cooked. The preparation surface 201 may be made from the materials from which the retentive element 21 is made or from a variety of other materials, including those that are considered non-stick or have non-stick coatings. The preparation surface 201 may be specially configured to permit cooking to take place.

Among the materials from which the preparation surface 201 may be made are those materials that can retain its shape even when exposed to those non-ambient temperatures to which the surface 201 is subjected during the cooking process. Examples of preferred materials from which the surface 201 may be made include metal—for example, one that, in addition can withstand the temperature differences to which the surface 201 is subjected during the cooking process and imparts no flavoring to the food item 121, such as a stainless steel or a gold or gold plated material. The metal can be uncoated or coated, such as with a material that prevents the food item 121, from sticking to the surface 201. An example of such coating material is Teflon®.

The preparation surface 201 may also be made from a material which changes in shape or composition as a result of being exposed to the temperature differences experienced during the cooking process. For example, the preparation surface 201 may be made from a material that is solid but melts when exposed to heat and that may impart desired flavorings or additives to the food item during planned cooking.

The preparation surface 201 may have a variety of constructions. For example, in one simplified embodiment shown in FIG. 2, the preparation surface 201 is constructed as a screen 211. A preparation surface 201 constructed as a screen 211 is advantageous in that the juices and fats that are produced during the cooking of a food item 121 can drain or drip into the lower portion 91. These drainings or drippings can be discarded or may be used in the preparation of an additional food item 121. The lower portion 91 may include water, stock, soup, or other food item 121 that may accept, for example, the drainings or drippings from the food item that is being cooked.

Additionally, the preparation surface 201 be shaped to facilitate planned cooking. For example, the preparation surface 201 may include one or more concave surfaces on which a food time 121 may be cooked to hold other food items, seasonings, or fluids or to retain by-products of the cooking process or to import a shape to the food item 121 when cooked. The preparation surface 201 may also be textured, channeled, or open to facilitate cooking, which in certain cases would permit cooking by-products to be held, or drawn, or drip away.

Figure 2:
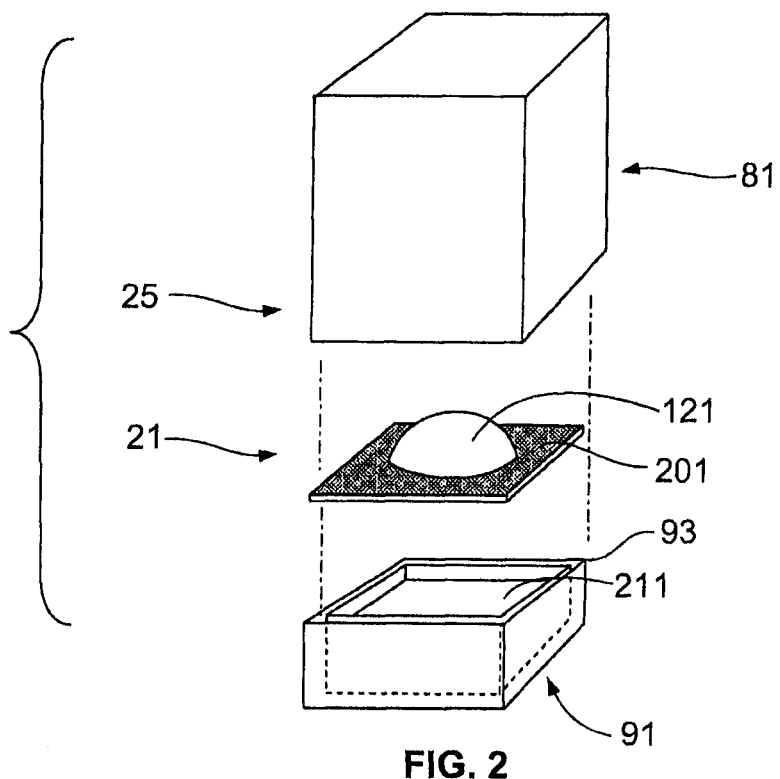
FIG. 2 is a perspective view of another embodiment of a cooking box according to the present invention providing a simplified construction and generally uniform shape to facilitate planned cooking and including an internal cooking surface.
Figure 4:
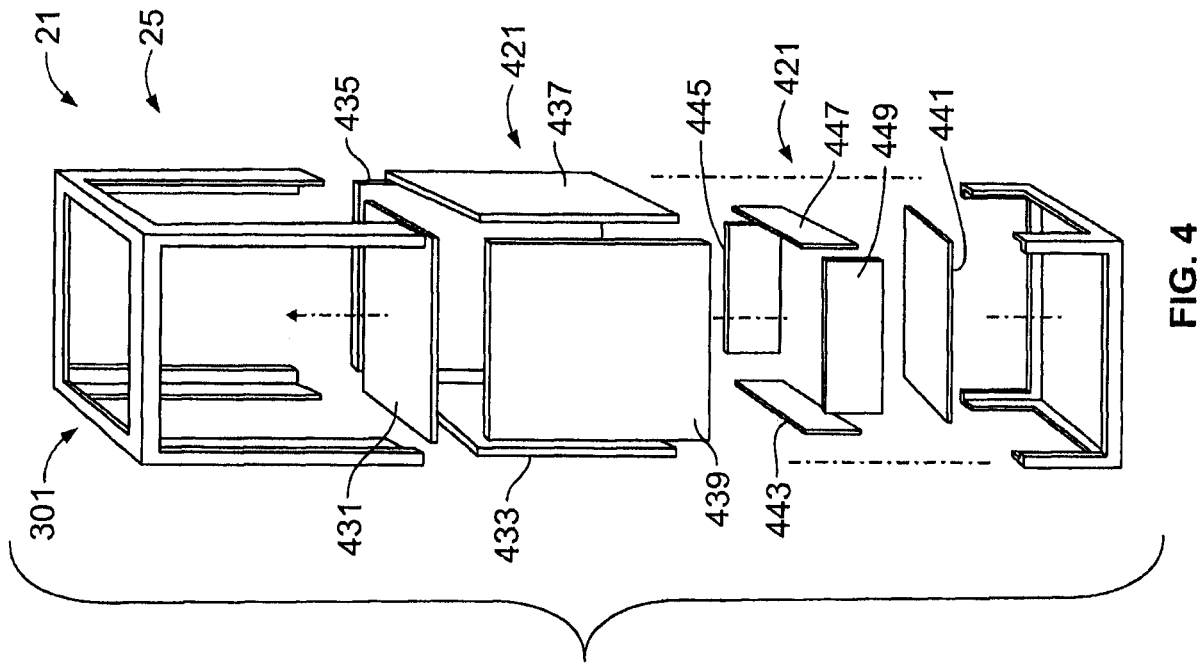
Figure 3:
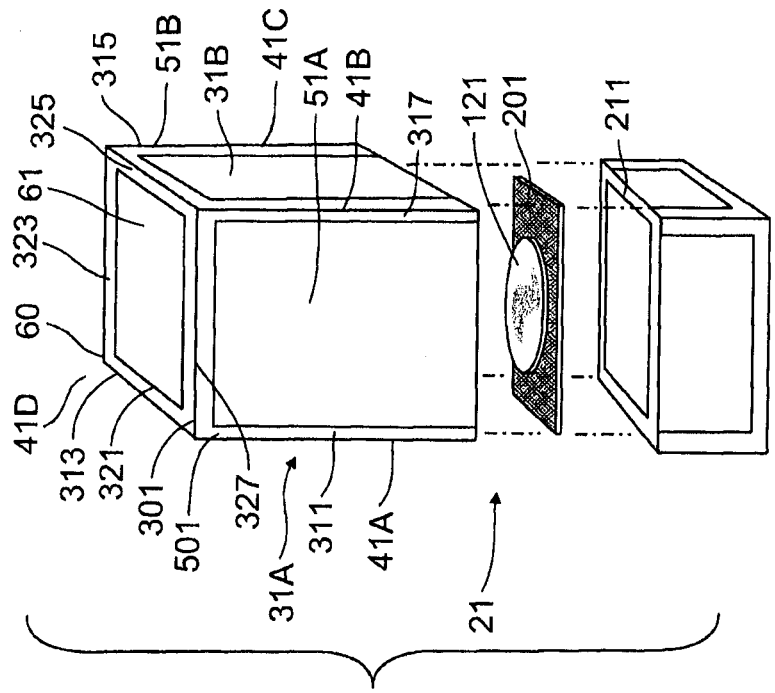
Figure 5A:
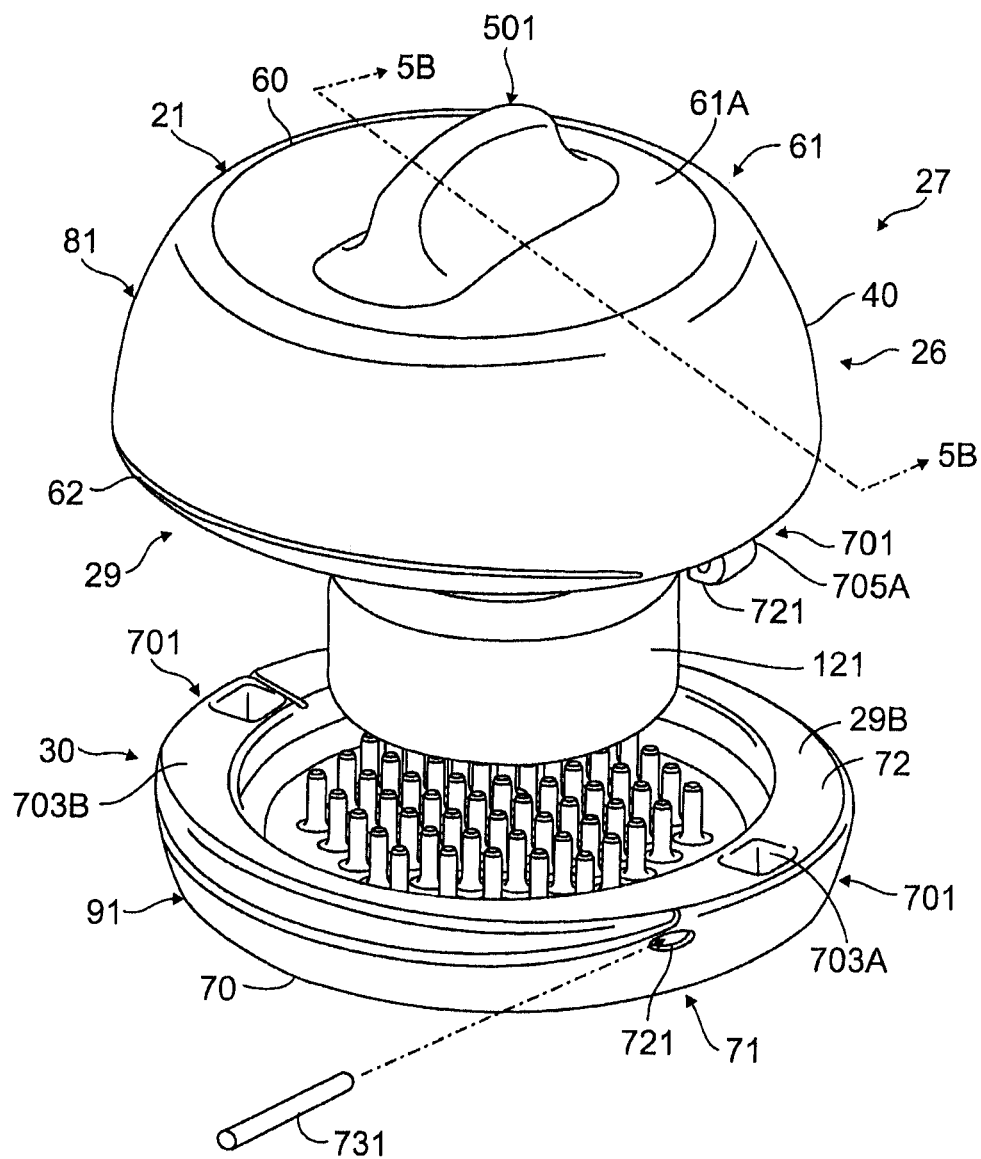
Figure 5B:
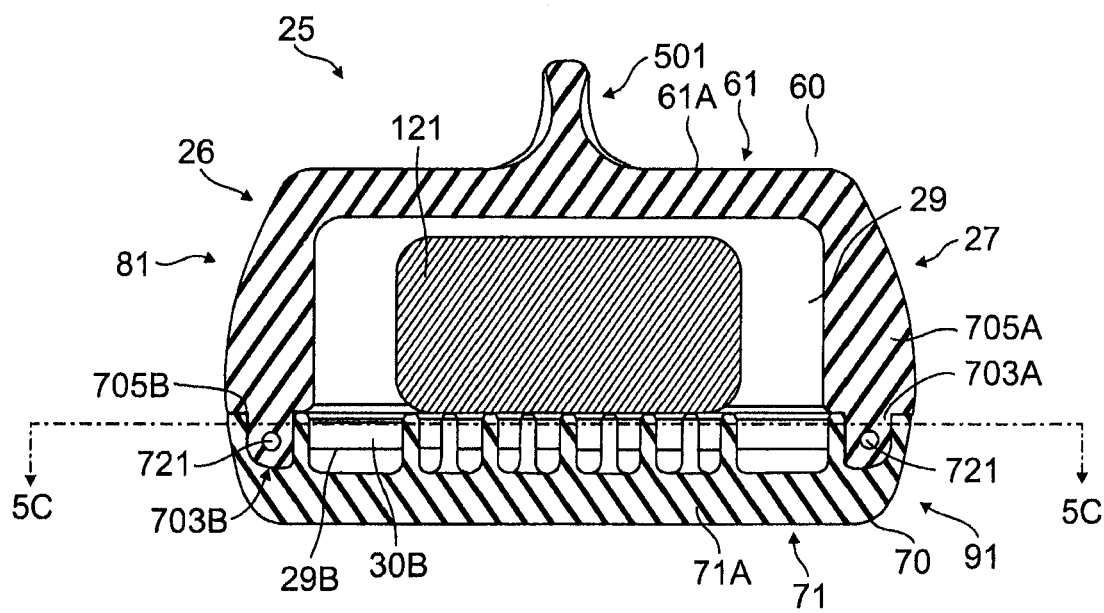
Figure 5C:
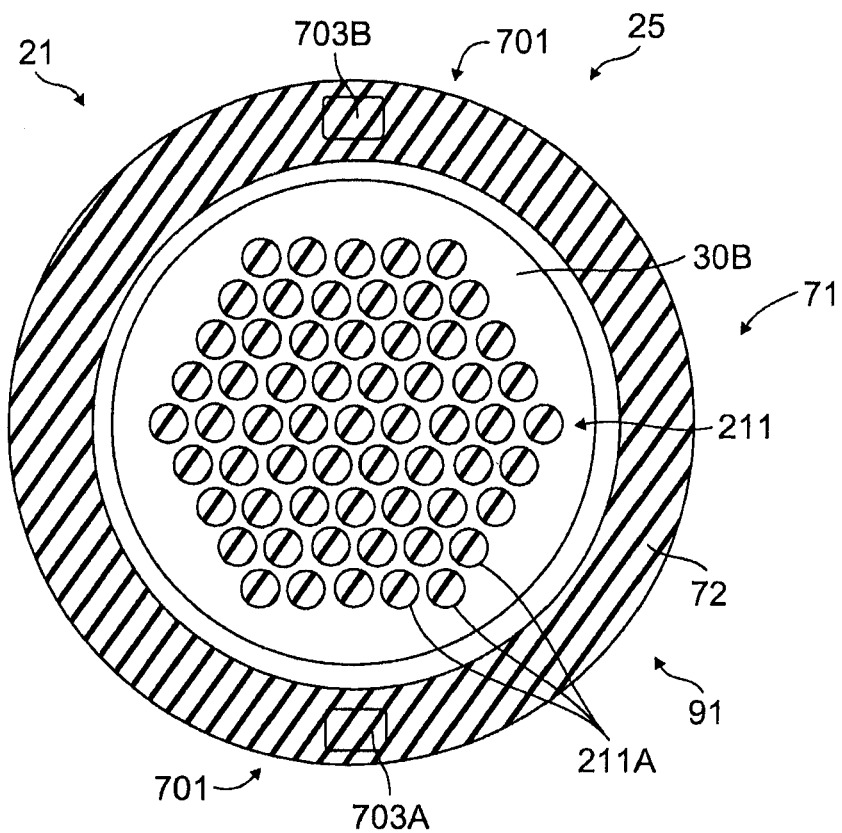
Figure 5D:
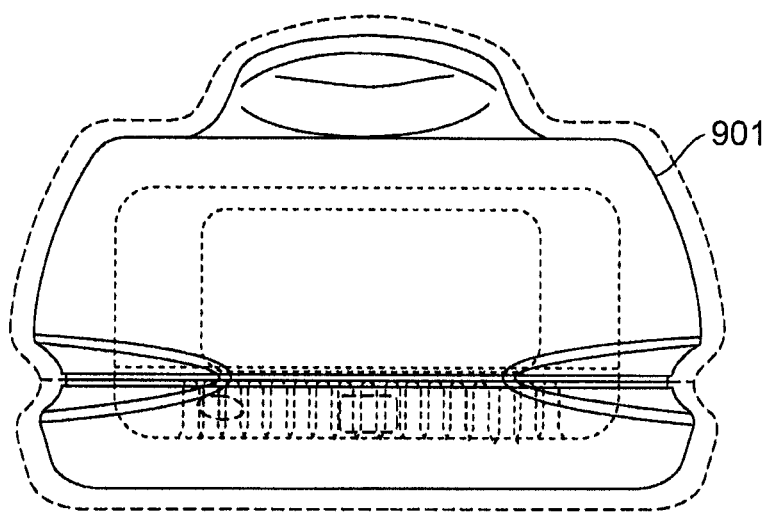
Figure 6A:
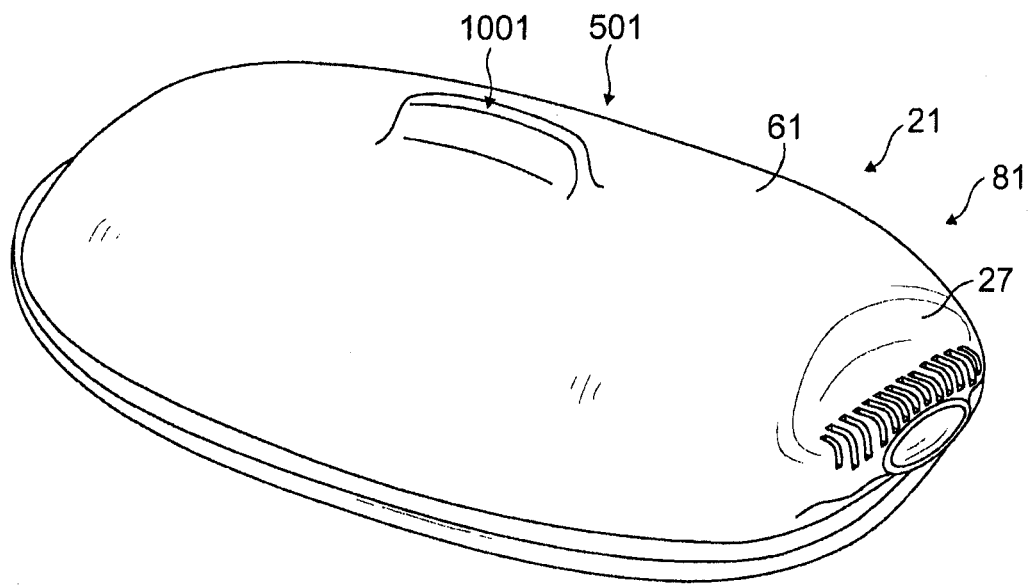
Figure 6B:
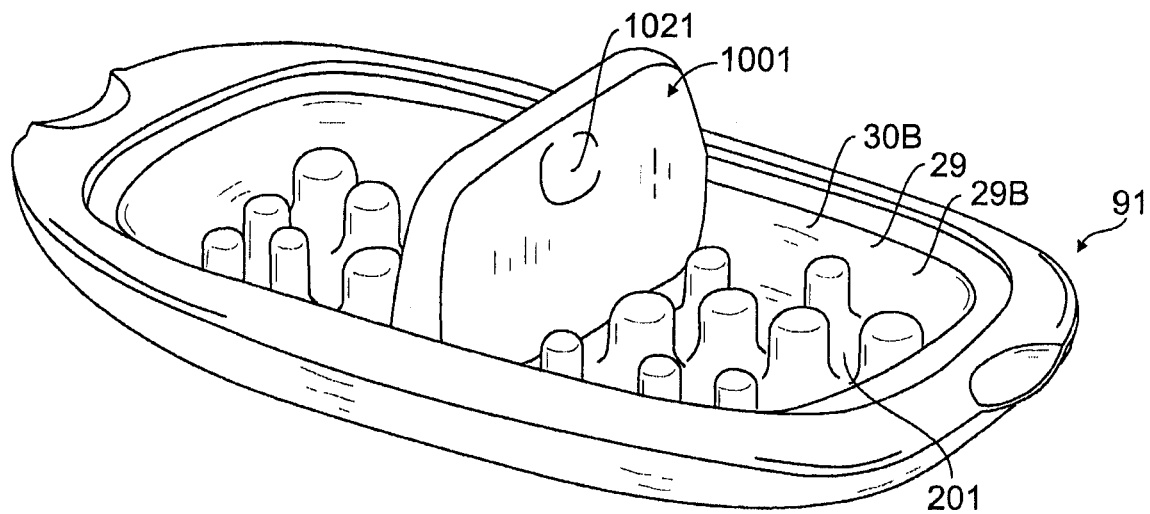
Figure 6C:
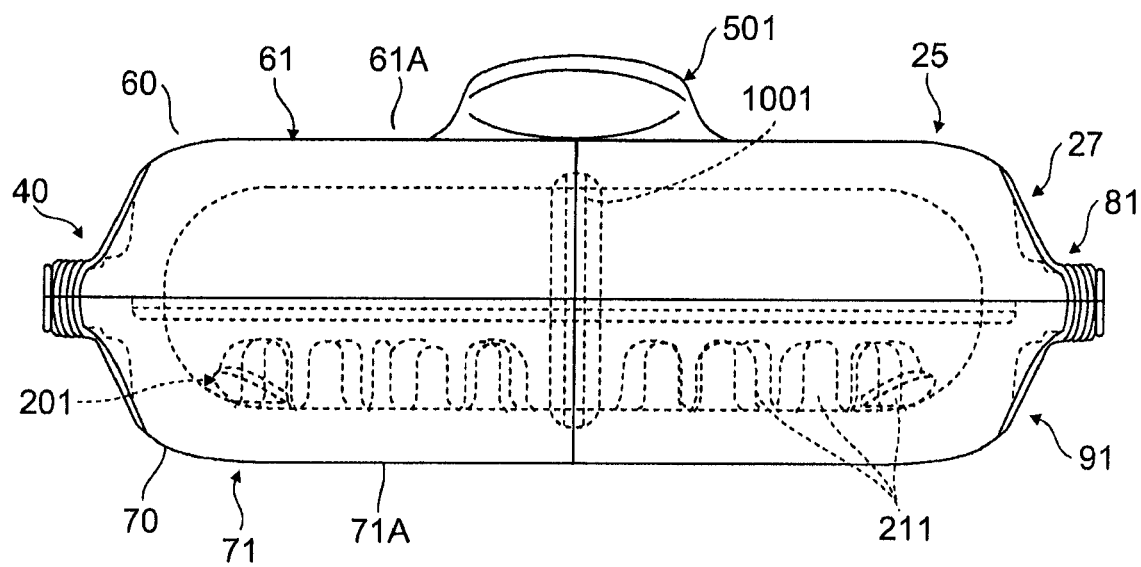
Figure 6D:
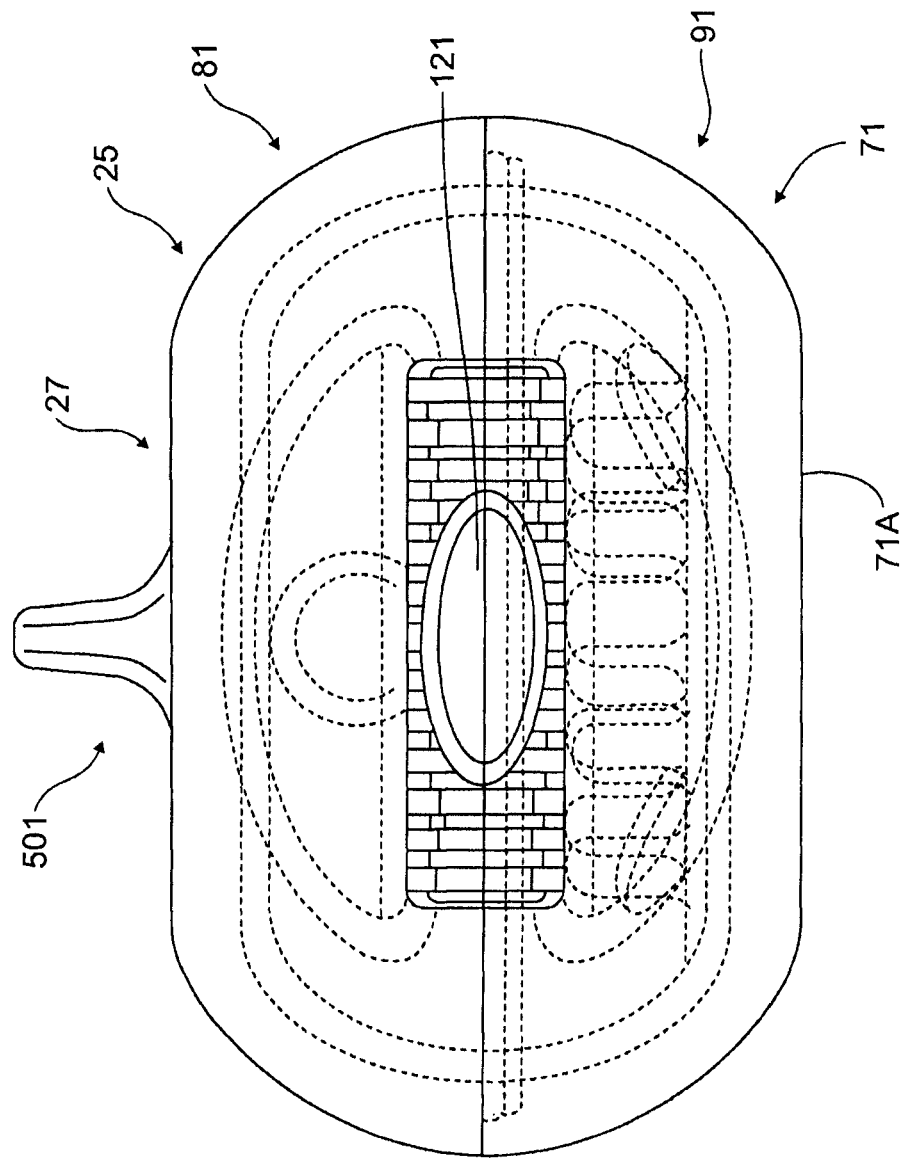

FIG. 2 shows another embodiment of a temperature retentive element 21 according to the present invention shaped to form a rectangular shaped box 25. While the box 25 is similar to that which is shown in FIG. 1, the FIG. 2 embodiment includes a preparation surface 201 sized and shaped for the receipt of a food item 121. As in other embodiments, the retentive element 21 may be sized and shaped to provide a receiving area 211 on which the preparation surface 201 may be engaged or received. The preparation surface 201 of the FIG. 2 embodiment may mate with or rest on a receiving area 211 formed within the retentive element 21 of box 25. In the FIG. 2 embodiment, the receiving area 211 extends adjacent to an upper edge 93 of the retentive element 21 forming the lower box portion 91 so that the upper box portion 81 may be received on the lower box portion 91 and still form a generally continuous wall 26.

The retentive element 21 in the simplest embodiment preferably is formed from a material that is of food grade (that is, suitable for use in contact with food) and is able to accept and retain heat or cold for a sufficient amount of time to permit the cooking to take place. Two component silicones is one such broad group of suitable materials.

One group within the preferred group of two component silicones is known as tin-catalysed silicones. An example of a tin-catalysed material is known by the product name RTV 862. A source of RTV 862, and other two component silicones is Eager Plastics, Inc. of Chicago, Ill. RTV 862 is particular advantageous in that it can accept and retain a very wide range of heat (up to 1200° F.) and cold. This material is also very durable and typically can withstand the repeated handling to which equipment in a restaurant environment is submitted. It, like certain of the other of the preferred silicones can be colored to provide additional advantageous qualities to the box. For example, a dark colored silicone used to make the retentive element 21 from which the box 25 is formed can provide a reflective exterior surface. A box 25 made from such retentive element 21 with such a reflective surface also can heighten the dining experience by providing a drama to the opening of the box to remove the food item 121 when cooked.

Another group within the preferred group of two component silicones is known as platinum-catalysed silicones. An example of a platinum-catalysed silicone is known by the product name as P4. P4 can withstand high temperatures (in certain cases up to 800° F.) and cold. P4 is advantageous for purposes of heightening the dining experience in that the material is generally clear. As a result, a diner or diners can watch a food item 121 cook while the box 25 is in the remote position.

The materials from which the retentive element 21 is formed can be sized and shaped to provided generally known temperature retentive characteristics to the retentive element 21 and thereby facilitate planned cooking. Given that the temperature retention properties of the retentive material from which the retentive element 21 is formed are generally known, the retentive element 21 from which the box 25 is formed can be made of a certain thickness in order to facilitate a generally known amount of heat or cold to be developed internally in order to facilitate planned cooking. For example, retentive element 21 made from thicker material can generally hold the non-ambient temperature to which the retentive element 21 is subjected longer. Therefore, if, for example, a relatively thicker or larger food item 121 is to be cooked through the development of high heat within the box 25 formed from the retentive element 21, a retentive element 21 formed from thicker retentive material will hold a high heat within the box 25 for a longer period of time. Similarly, if a food item 121 is to be cooked by the application of cold, a retentive element 21 formed from thicker retentive material will hold a relatively cold temperature within the box 25 for a longer period of time. More specifically, the retentive element 21 can be formed into a box 25 that can retain heat for a sufficient period of time in order to cook a raw piece of meat—such as fish or meat—that is inserted in the box when the box is in a location remote from an oven (such as on the table of a diner or diners). The retentive element 21 for such a box 25 and application can be made from the preferred silicone material that is at least one quarter of an inch thick. If the wall 26 is thicker than one quarter of an inch, heat can be generally retained within the box 25 for a longer period of time such as to permit the cooking one or more additional food items 121. Whether the box 25 can be used to cook the additional food item 121 will depend upon how many times the box is opened (thereby permitting the temperature within the box 25 to moderate and become more like the room temperature) and the temperature of the room in which the remote cooking takes place.

In the simplest form, the retentive element 21 and a box 25 formed from it includes no means for transforming power—such as electric or gas—into heat or cold. Accordingly, planned cooking can occur with the box 25 without the need for wiring, thereby allowing cooking to occur in remote places without an immediate power source and without a cluttered appearance.

Figure 3:
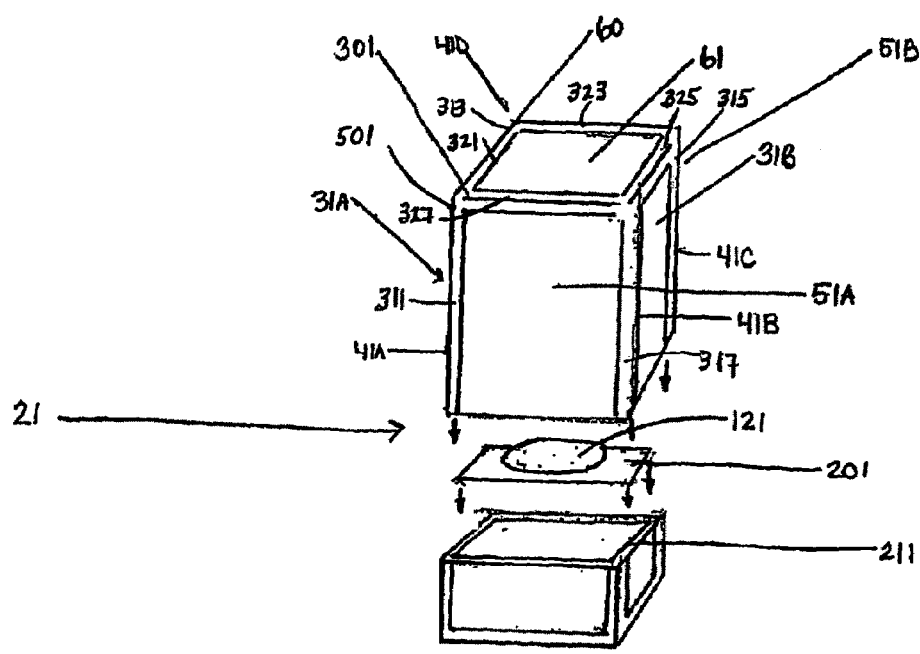
FIG. 3 is a perspective view of another embodiment of a cooking box according to the present invention providing a simplified construction and generally uniform shape and including a frame forming and extending adjacent to wall edges.
Figure 4:
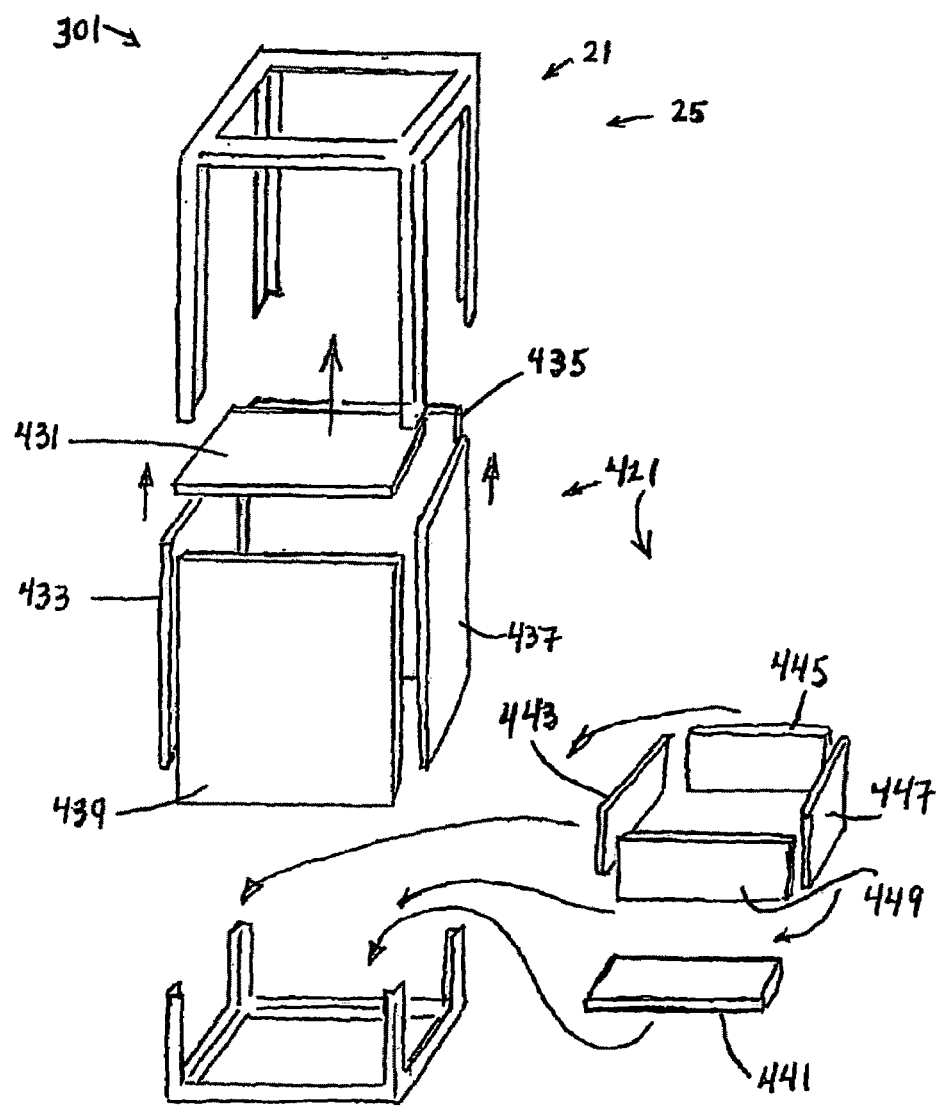
FIG. 4 is a perspective view of an embodiment of a cooking box according to the present invention showing the retentive element separated in retentive panels and the retentive panels in place to be inserted within a frame.

FIG. 3 shows another embodiment of a retentive element 21 formed into a rectangular shaped box 25. The box 25 is similar to that which is shown in FIG. 2 and includes an elevated preparation surface 201 sized and shaped for the receipt of a food item 121. As with the FIG. 2 embodiment, the preparation surface 201 in the FIG. 3 embodiment may mate with or rest on a receiving area 211 formed within the box 25. The FIG. 3 embodiment differs from the FIG. 2 embodiment in that the FIG. 3 embodiment includes a frame 301. The frame 301 in the FIG. 3 embodiment includes vertical frame elements 311, 313, 315 and 317, that extend along and adjacent to the vertical side wall edges 41A, 41B, 41C, and 41D at which the opposing walls 31A, 31B and 51A, 51B are joined and horizontal frame elements 321, 323, 325 and 327 along the top edge 60 at which the top 61 is joined to the walls 31A, 31B and 51A, 51B and along the bottom edge 70 at which the bottom 71 is joined to the walls 31A, 31B and 51A, 51B. The frame 301 may constructed to permit the box to be constructed easily such as from individual retentive panels (discussed below) inserted within receiving areas of the frame 301. For example, frame 301 can be formed as a separate structure and which can receive the retentive element 21 formed as separate retentive element panels 421. Such an embodiment is shown in FIG. 4. The FIG. 4 embodiment includes a temperature retentive element 21 separated in retentive element panels 421 as upper panels 431, 433, 435, 437, and 439 and lower panels 441, 443, 445, 447, and 449. The panels 421 are sized and shaped and configured to be receivable within the frame 301 so that intra-panel gaps open to the external area of the box 25 are minimized or non-existent.

Alternatively, the frame 301 can comprise an edging 501 forming a face on the exterior surface of the reflective element 21. Such an embodiment is shown in FIG. 3.

The frame 301 may also provide structural strength to the box 25 and permit the box 25 to be subjected to rougher handling that may otherwise cause damage. The frame 301 may be made from the same retentive material from which the retentive element 21 is formed but, for example, of a greater thickness or density. This permits the frame and the wall to respond to temperature differences in similar or nearly identical fashion. The frame 301 also may be made from a different material or materials that provide additional advantages. For example, a frame 301 made from metal may allow the box 25 to be handled even more roughly and, for example, dropped generally without damage to the corners or edges of the box. One of the suitable metals from which the frame 301 may be made is aluminum or an aluminum alloy. A frame 301 made from this material cools quicker than, for example, a wall made from silicone, thereby permitting the box to be picked up by hand from this area without little or no protection. Another suitable material from which the frame 301 may be made is titanium or a titanium alloy. Such a material is advantageous in that it does not moderate in temperature quickly and so, if the box 25 was heated, the frame 301 would add heat to the wall 26 even while the heat is being dissipated therefrom. A box 25 having a frame as described is aesthetically pleasing in that the wall appears to have windows through which the cooking process may be observed, such as by the diner or diners.

The following describes certain particular uses of the box 25 of the present invention. For cooking through the use of an elevated temperature (that is, one higher than room temperature), the retentive element 21 formed into box 25 and without food item 121 or items inserted therein is subjected to treatment that elevates the temperature of the retentive element 21 and thereby the box 25. One method by which the temperature of the retentive element 21 may be elevated is by subjecting the element 21 to microwaves as is known in the cooking arts. Of course, a retentive element 21 having a frame 301 made from metal could not be subjected to the microwave temperature elevation process. The retentive element 21 also may be placed within a hot bath or a hot oven or other source of high heat. The retentive element 21 is permitted to be subjected to such temperature elevation process for a period of time that is sufficient to heat the exterior and the interior of the box 25 formed from the retentive element 21. Given the heat resistant qualities of the preferred materials from which the retentive element 21 may be made, the retentive element 21 and thereby the box 25 may be brought to a temperature by which a food item—even those that require the application of high temperature, such as fish or meat—may be cooked. For example, the retentive element 21 formed in a box 25 may be placed in an oven that is at or brought to 800 degrees F. The heated box 25 is then delivered to the table such as on a sheet or plate. The box 25 is opened and the food item 121 is inserted for cooking. While the diner, for example, enjoys one or more courses of a meal, the food item 121 or items are cooking within the box 25. In those embodiments in which the retentive element 21 is made from generally clear material, the diner or diners can watch the food item 121 or items cook. At the completion of the time for cooking, the box 25 is opened, the food item 121 or items removed and served to the diner. One of food items 121 or portions of a food item that were inserted in the box 25 for cooking may be retained in the box for service later such as after additional ingredients are added to form another course of the dinner. For example, the juice or drippings from a meat item may be retained and from those a gravy, soup, or stock may be prepared.

Figure 5A:
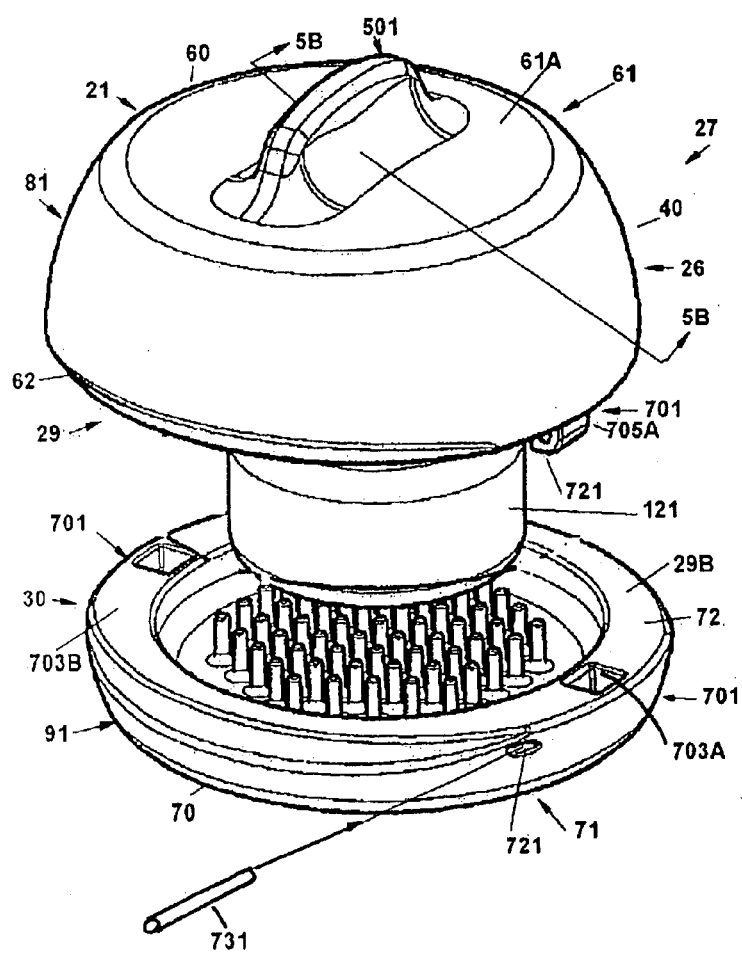
FIG. 5A is a perspective view of an additional embodiment of a cooking box according to the present invention.

FIG. 5A through FIG. 5D show an added embodiment of a temperature retentive element 21 according to the present invention. FIG. 5A shows a perspective view of a temperature retentive element 21 sized and shaped to form a box 25 having an outer surface 27 and an inner surface 29, each of which may be generally curved. The inner surface 29 of the FIG. 5A through FIG. 5D embodiment is sized and shaped to define a cavity 30 within which a food item 121 may be received and cooked.

More specifically, the embodiment of the temperature retentive element 21 illustrated in FIG. 5A through FIG. 5D is sized and shaped to form a wall 26 including a vertical side wall 40 having a generally curved outer surface 27 that transitions along top edge 60 to a top wall 61 including a generally planar top surface 61A and along lower edge 70 to a bottom wall 71 including a generally planar bottom surface 71A, the top wall 61 in this embodiment shown as opposing the bottom wall 71. The side wall 40 of the FIG. 5A through FIG. 5D embodiment is sectioned to provide an upper box portion 81 opposing a lower box portion 91.

As with other embodiment, the retentive element 21 of the FIG. 5A through FIG. 5D embodiment may be sized and shaped so that a single food item or multiple food items 121 can be cooked within the box 25 simultaneously.

The generally curved vertical side wall 40 facilitates the development of a known temperature with the box 25. The retentive element 21 of the portions 81, 91 may also be sized and shaped to facilitate the lifting, transport, and/or service of the box 25. The embodiment of the box 25 shown in FIG. 5A through FIG. 5D is sized and shaped so that an individual may lift the upper portion 81. More specifically, the illustrated embodiment includes a handle 501 by which the upper portion 81 may be lifted from the lower portion such as during service of the food item or items 121 or otherwise or, if the upper portion 81 is generally united to the lower portion 91 (such as according to the steps described below), the entire box 25 may be lifted. The handle 501 is shown in the illustrated figures as rising above the generally planar top surface 61A.

Figure 5B:
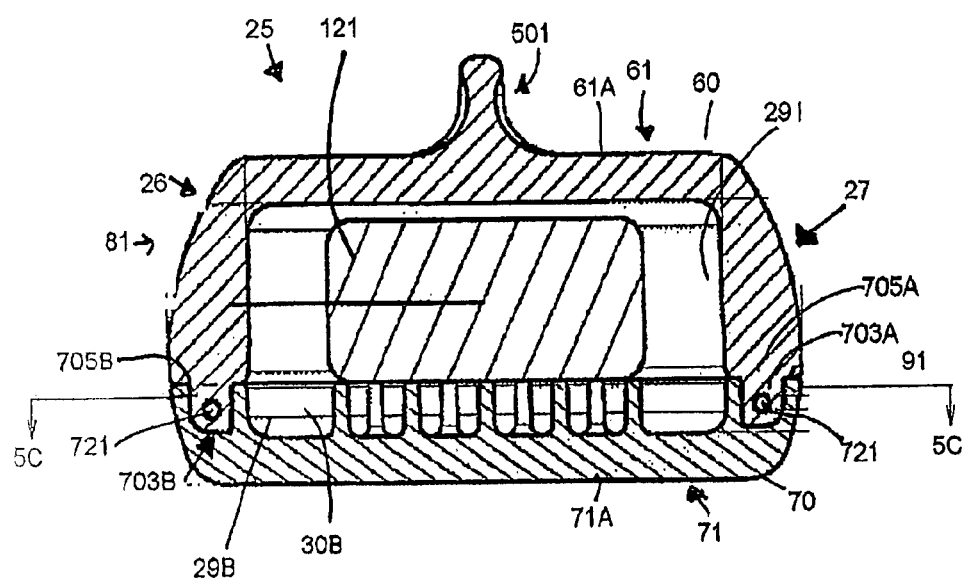
FIG. 5B is a cross sectional view of the embodiment of the cooking box shown in FIG. 5A.
Figure 5C:
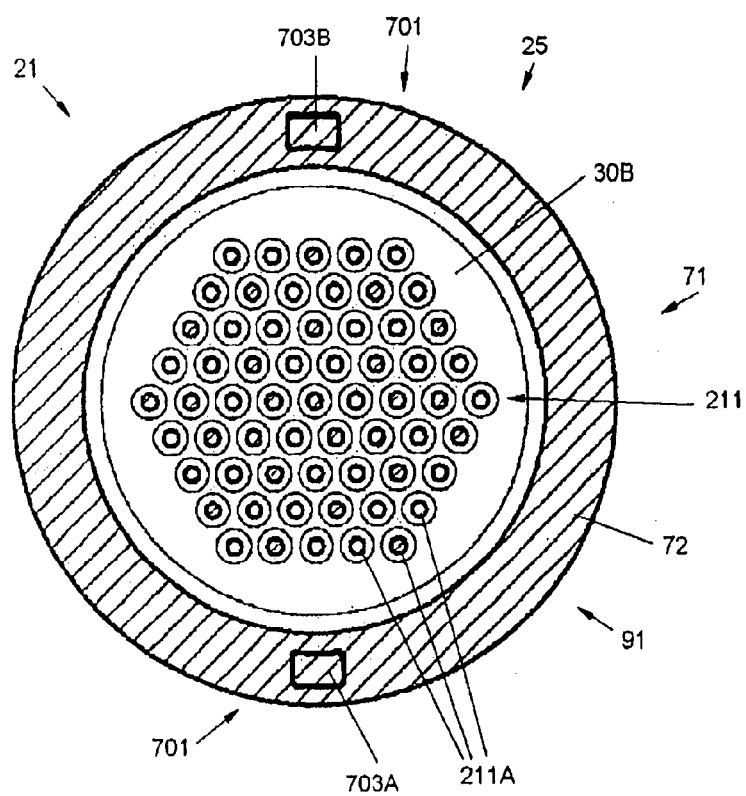
FIG. 5C is an overhead cross sectional view of the embodiment of the cooking box shown in FIG. 5A and FIG. 5B.

In the embodiment illustrated in FIG. 5A through FIG. 5D, the upper portion 81 may be mated with the lower portion 91 (such as shown in FIG. 5B) to provide a generally continuous outer surface 27 and inner surface 29, and thereby a generally continuous wall 26 advantageously permitting the cooking that occurs inside the box 25 to be generally isolated from the exterior environment. As with the other embodiments, the embodiment illustrated in FIG. 5A through FIG. 5D may be formed from a retentive element 21 that is clear, transparent, or semi-opaque, so that the cooking that is taking place within the box 25 may be observed without having to open the box 25 and thereby coming into direct contact with the by-products of the cooking process—for example, noise, spatterings, or cooking odors or fumes.

The outer surface 27 of the bottom 71 may be sized and shaped and textured to permit the box 25 to rest on a serving site 15 to permit planned cooking within the box 25 to occur.

The temperature retentive element 21 of the embodiment shown in FIG. 5A through FIG. 5D is sized and shaped to provide an inner surface 29 which includes a lower inner surface portion 29B that defines a cavity portion 30B at least within the lower box portion 91 that is sized and shaped to accommodate a food item 121 therein. While the food item 121 may rest on the lower inner surface portion 29B of the bottom wall 71, the food item 121 may also be spaced above the inner portion 29B that is generally adjacent to the generally planar bottom surface 71A.

The retentive element 21 of the embodiment shown in FIG. 5A through FIG. 5D includes a separate preparation surface 201 on which the food item 121 may be cooked. The preparation surface 201 of the illustrated embodiment includes a plurality of legs 211 that may be made from the materials from which the retentive element 21 is made or from one or more of a variety of other materials, including those that are considered non-stick or have non-stick coatings. The legs 211 of the illustrated embodiment extend generally vertically above the portion of the bottom wall 71 area adjacent to the bottom surface 71A and include surfaces 211A on which one or more food items 121 may rest for cooking. Advantageously, the juices and fats that are produced during the cooking of a food item 121 can drain or drip into the lower cavity portion 30B and be discarded or used in the preparation of an additional food item 121. Alternatively, water, stock, soup, or other food item 121 may be place in the lower cavity portion 30B to facilitate that which is being cooked on the legs 211.

The embodiment of the present invention shown in FIG. 5A through FIG. 5D includes a uniting component 701 by which the upper portion 81 may be united to the lower portion 91 to facilitate closed cooking or the service of the food item or items 121 or other purpose including transport or storage. The uniting component 701 of the illustrated embodiment includes apertures 703A, 703B in the lower wall 71 that open from the lower wall upper edge 72 that are sized, shaped, and positioned to receive female components 705A, 705B that extend from the upper wall lower edge 62. The fit of components 705A, 705B in apertures 703A, 703B may be generally close enough and the material from which the components 705A, 705B are made may be elastic enough that the top portion 61 is generally releaseably united to the bottom portion 71. To further ensure that the portions 61, 71 are generally releaseably united to each other the embodiment of the uniting component 701 may include an aperture 721 that extends through the wall 71 and through one or more of the female components 705A, 705B and a pin 731 receivable therethrough. FIG. 5A shows the aperture 721 opening through the wall 71 and through one of the female components 705A. FIG. 5B shows the aperture 721 through each of the female components 705A, 705B.

Figure 5D:
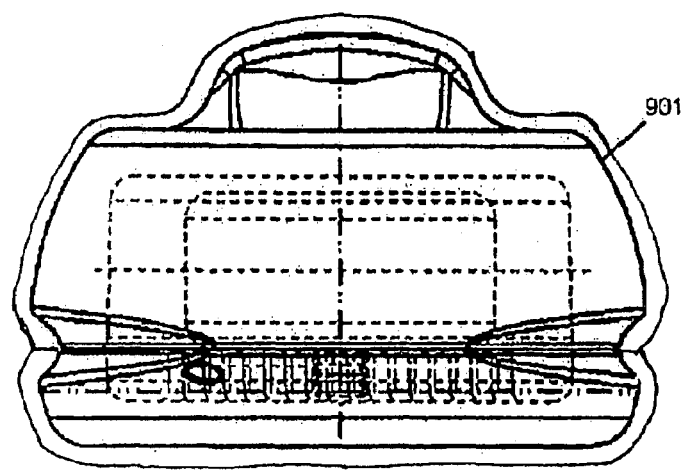
FIG. 5D is a side view of the embodiment of the cooking box shown in FIG. 5A through 5C and including an outer moderation layer and features within the box in broken line.

The retentive element 21 of the embodiments of the present invention may be formed from the GE silicones, RTV11, LIM 6050, and LIM 5060 or other food grade elastomers. The materials advantageously retain the temperature to which they are exposed for cooking. Preferred materials from which the retentive element 21 may be formed are those also which may be molded through injection or compression or are pourable. The retentive elements may be coated to provide an outer moderation layer 901 that moderates the loss of the temperature of the retentive element and provides an outer surface that is closer to ambient temperatures thereby allowing a person to come into contact with the box 25. One of the many materials from which the outer moderation layer 901 may be formed is an aerogel. FIG. 5D shows an embodiment of the present invention that includes an outer moderation layer 901 over the outer surface 27.

Figure 6A:
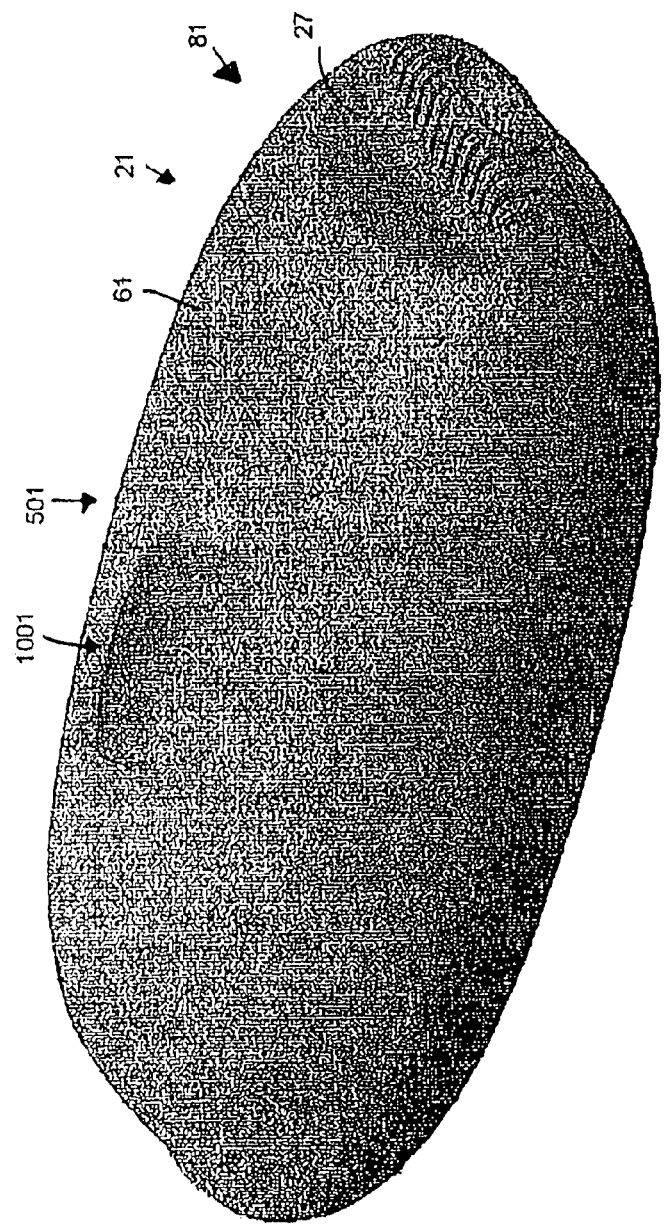
FIG. 6A is a perspective view of an additional embodiment of a cooking box according to the present invention, showing the upper portion thereof.
Figure 6B:
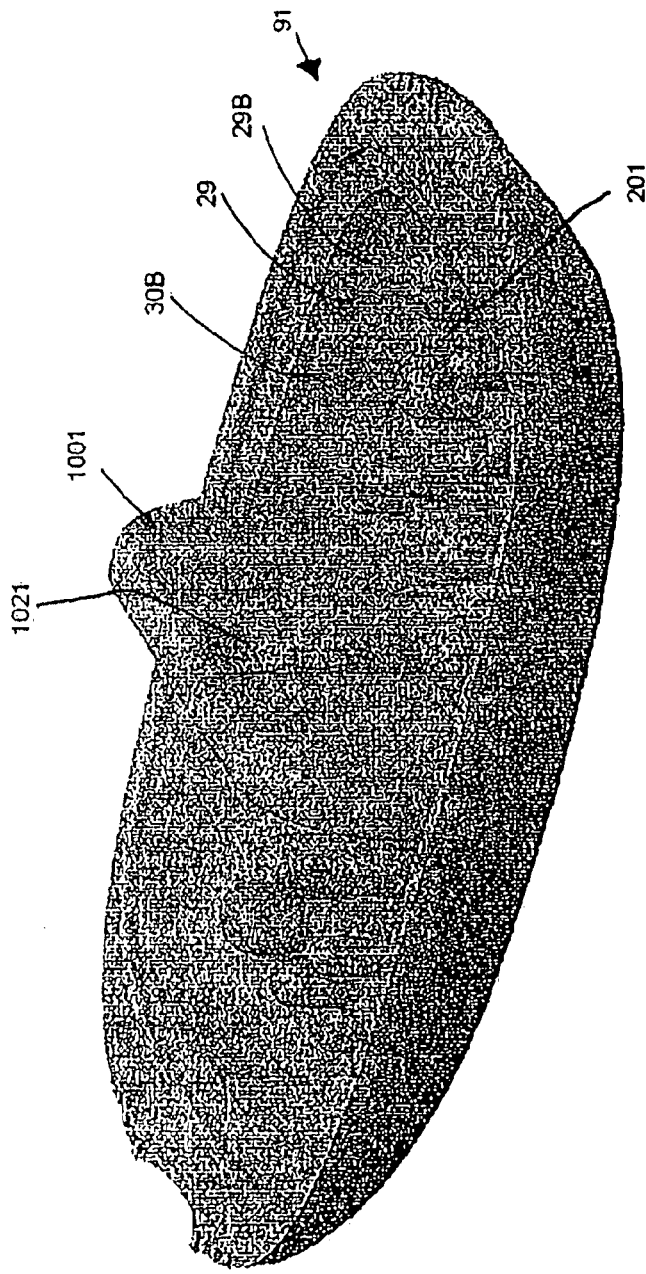
FIG. 6B is a perspective view of the embodiment of the cooking box shown, in part, in FIG. 6A, showing the bottom portion thereof.

FIG. 6A through FIG. 6D show an added embodiment of a temperature retentive element 21 according to the present invention. FIG. 6A shows a perspective view of a temperature retentive element 21 sized and shaped to form an upper portion 81 of a box 25 having an outer surface 27 that is generally curved and an inner surface 29 that is generally curved. FIG. 6B shows a perspective view of a temperature retentive element 21 sized and shaped to form a lower portion 91 of a box 25 having an outer surface 27 that is generally curved and an inner surface 29 that is generally curved and which overall is sized and shaped to mate with the upper portion 81 shown in FIG. 6A to form box 25 (that is shown as united in FIG. 6C and FIG. 6D). The inner surface 29 of the FIG. 6A through FIG. 6D embodiment is sized and shaped to define a cavity 30 within which a food item 121 (shown in FIG. 6D) may be received and cooked.

More specifically, the embodiment of the temperature retentive element 21 illustrated in FIG. 6A through FIG. 6D is sized and shaped to form a wall 26 including a vertical side wall 40 having a generally curved outer surface 27 that transitions along top edge 60 to a top wall 61 including a generally planar top surface 61A and along lower edge 70 to a bottom wall 71 including a generally planar bottom surface 71A, the top wall 61 in this embodiment shown as opposing the bottom wall 71. The side wall 40 of the FIG. 6A through FIG. 6D embodiment is sectioned to provide an upper box portion 81 that unites to opposing a lower box portion 91 to form box 25.

As with other embodiments, the retentive element 21 of the FIG. 6A through FIG. 6D embodiment may be sized and shaped so that a single food item or multiple food items 121 can be cooked within the box 25 simultaneously. To lessen the likelihood that the fragrances, smells, fumes, or odors produced by the cooking of one food item in the box 25 may affect the cooking of another or other food items in the box 25, the FIG. 6A through FIG. 6D embodiment advantageously permits the receipt of a divider 1001. In the illustrated embodiment the divider 1001 is positioned to generally bisect the long axis of the box 25 so that generally equal cooking areas are produced within the box 25. However, embodiments of the present invention may include a divider or dividers 1001 that permit the partitioning of the inner area of the cooking box 25 into more than two separate areas. The divider shown in FIG. 6B includes lifting areas 1021 that facilitate the handling of the divider 1001 (such as lifting or lowering or otherwise positioning of the divider in or out of the box 25).

The generally curved vertical side wall 40 facilitates the development of a known temperature with the box 25. The retentive element 21 of the portions 81, 91 may also be sized and shaped to facilitate the lifting, transport, and/or service of the box 25. The embodiment of the box 25 shown in FIG. 6A through FIG. 6D includes a handle 501 by which the upper portion 81 may be lifted from the lower portion such as during service of the food item or items 121 or otherwise. The handle 501 is shown in the illustrated figures as rising above the generally planar top wall 61.

Figure 6C:
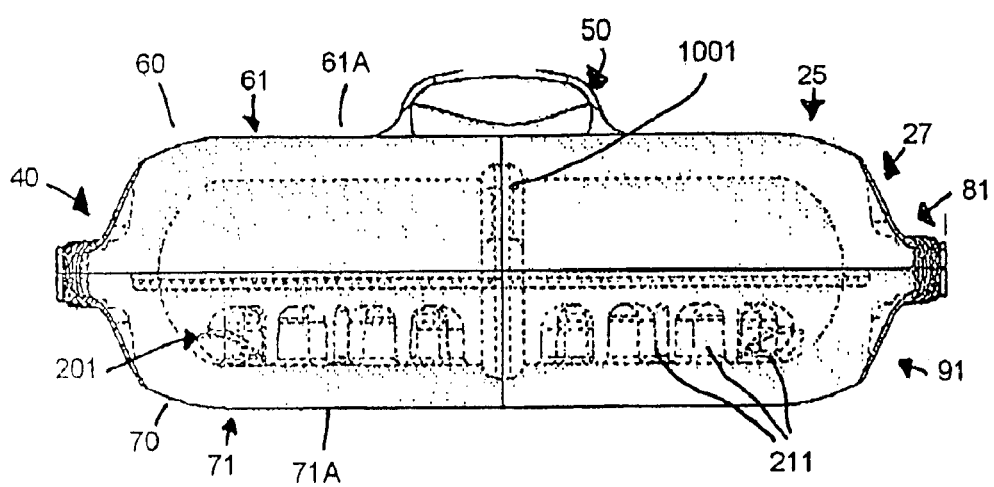
FIG. 6C is an side view of the embodiment of the cooking box shown, in part, in FIG. 6A and FIG. 6B.
Figure 6D:
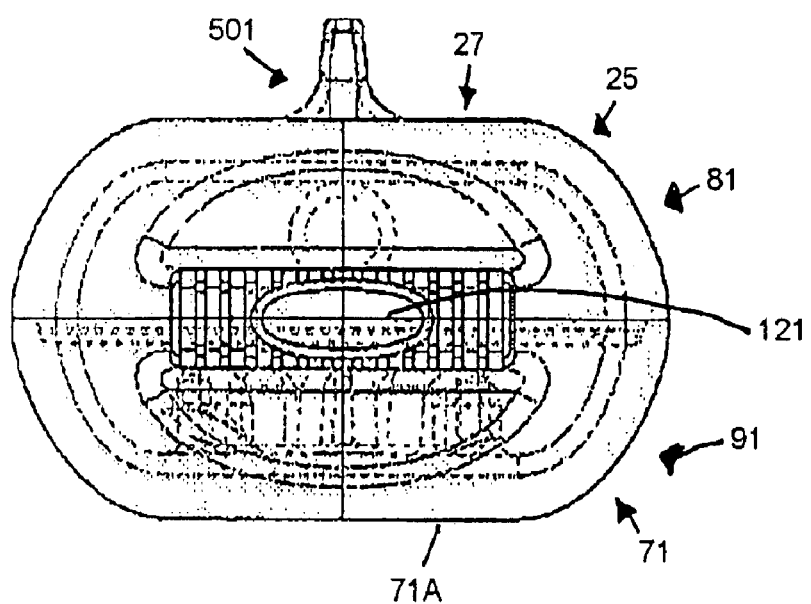
FIG. 6D is an additional side view of the embodiment of the cooking box shown in FIG. 6A through FIG. 6C.

In the embodiment illustrated in FIG. 6A through FIG. 6D, the upper portion 81 may be mated with the lower portion 91 (such as shown in FIG. 6C and FIG. 6D) to provide a generally continuous outer surface 27 and inner surface 29, and thereby a generally continuous wall 26 advantageously permitting the cooking that occurs inside the box 25 to be generally isolated from the exterior environment. The embodiment illustrated in FIG. 6A through FIG. 6D may be formed from a retentive element 21 that is clear, transparent, or semi-opaque, so that the cooking that is taking place within the box 25 may be observed without having to open the box 25 and thereby coming into direct contact with the by-products of the cooking process—for example, noise, spatterings, or cooking odors or fumes.

The outer surface 27 of the bottom 71 may be sized and shaped and textured to permit the box 25 to rest on a serving site 15 to permit planned cooking within the box 25 to occur.

The temperature retentive element 21 of the embodiment shown in FIG. 6A through FIG. 6D is sized and shaped to provide an inner surface 29 which includes a lower inner surface portion 29B that defines a cavity portion 30B at least within the lower box portion 91 that is sized and shaped to accommodate a food item 121 therein. While the food item 121 may rest on the lower inner surface portion 29B of the bottom wall 71, the food item 121 may also be spaced above the inner portion 29B that is generally adjacent to the generally planar bottom surface 71A.

The retentive element 21 of the embodiment shown in FIG. 6A through FIG. 6D includes a separate preparation surface 201 on which the food item 121 may be cooked. As shown in FIG. 6C and FIG. 6D, the preparation surface 201 of the illustrated embodiment includes a plurality of legs 211 that may be made from the materials from which the retentive element 21 is made or from one or more of a variety of other materials, including those that are considered non-stick or have non-stick coatings. The legs 211 of the illustrated embodiment extend generally vertically above the portion of the bottom wall 71 area adjacent to the bottom surface 71A and include surfaces 211A on which one or more food items 121 may rest for cooking. Advantageously, the juices and fats that are produced during the cooking of a food item 121 can drain or drip into the lower cavity portion 30B and be discarded or used in the preparation of an additional food item 121. Alternatively, water, stock, soup, or other food item 121 may be placed in the lower cavity portion 30B to facilitate that which is being cooked on the legs 211.

As with other embodiments of the present invention, the embodiment of the present invention shown in FIG. 6A through FIG. 6D may include a uniting component 701 by which the upper portion 81 may be united to the lower portion 91 to facilitate closed cooking or the service of the food item or items 121 or other purpose including transport or storage.

It will be understood that the embodiments of the present invention which have been described are illustrative of some of the applications of the principles of the present invention. Numerous modifications may be made by those skilled in the art without departing from the true spirit and scope of the invention.

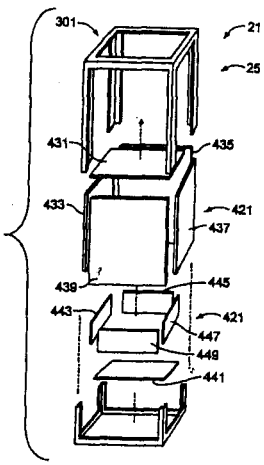

What is claimed is:

1. An apparatus for cooking a food item by application of non-ambient temperature, said cooking apparatus comprising:
    a temperature retentive element formed from a two component silicone material which can be subjected to and retain for a generally known period of time a retentive element temperature; and,
    said temperature retentive element configured to form a cooking box having and upper and lower cooking box sections and an internal surface having a cooking cavity in which the food item may be positioned for cooking by application of the retentive element.

2. A cooking and serving apparatus, said cooking and serving apparatus comprising:

a temperature retentive element formed from temperature retentive material wherein said temperature retentive material is a two component silicone which can be subjected to and retain for generally known periods of time a non-ambient temperature as a retentive element temperature;

said temperature retentive element configured in temperature retentive panels sized and shaped to be received in a frame;

said frame sized and shaped as a cooking box;

said cooking box including a cavity in which a food item can be inserted for cooking by application of the retentive element temperature; and, said cooking box sized and shaped to be delivered at a service site for the cooking and service of the food item.

3. A method for cooking and serving a food item, said method comprising:

subjecting a temperature retentive element formed from a two component silicone shaped as a cooking box to a temperature to develop a retentive element non-ambient temperature within the cooking box;

serving the cooking box to a service site;

inserting the food item within the cooking box;

holding the food item with the cooking box for a period of time so that to cook the item by application of the retentive temperature; and, serving the food item.

* * * * *

UNITED STATES PATENT AND TRADEMARK OFFICE
CERTIFICATE OF CORRECTION

| | | |
|---|---|---|
| PATENT NO. | : 7,690,294 B2 | |
| APPLICATION NO. | : 11/713575 | |
| DATED | : April 6, 2010 | |
| INVENTOR(S) | : Cantu | |

It is certified that error appears in the above-identified patent and that said Letters Patent is hereby corrected as shown below:

Delete Title page, illustrating a figure(s), and substitute therefor, a new Title page illustrating a figure(s). (attached)

Delete drawing sheets 1-7, and substitute therefor drawing sheets 1-7. (attached).

Signed and Sealed this

Eighteenth Day of May, 2010

David J. Kappos
*Director of the United States Patent and Trademark Office*

CERTIFICATE OF CORRECTION (continued)

(12) United States Patent
Cantu

(10) Patent No.: US 7,690,294 B2
(45) Date of Patent: Apr. 6, 2010

(54) COOKING AND SERVING SYSTEM AND METHODS

(76) Inventor: Homaro R. Cantu, 3829 N. Tripp, Chicago, IL (US) 60641

( * ) Notice: Subject to any disclaimer, the term of this patent is extended or adjusted under 35 U.S.C. 154(b) by 210 days.

(21) Appl. No.: 11/713,575

(22) Filed: Mar. 2, 2007

(65) Prior Publication Data
US 2007/0246037 A1    Oct. 25, 2007

Related U.S. Application Data

(63) Continuation-in-part of application No. 11/118,955, filed on Apr. 29, 2005.

(60) Provisional application No. 60/566,779, filed on Apr. 30, 2004.

(51) Int. Cl.
*A47J 37/08* (2006.01)
*A47G 23/04* (2006.01)

(52) U.S. Cl. .................. 99/401; 99/339; 126/246; 126/400; 126/375; 126/236.01; 219/730; 219/734; 219/620; 219/622; 219/624; 219/647; 219/663; 219/649; 219/759; 219/625; 219/626; 219/634; 220/215; 220/574.2

(58) Field of Classification Search ............... 219/730, 219/734, 620–22, 624, 647, 663, 649, 759, 219/625–6, 634, 665; 99/339, 401; 126/246, 126/236.01, 400, 375; 206/545; 220/215, 220/574.2
See application file for complete search history.

(56) References Cited

U.S. PATENT DOCUMENTS

| | | |
|---|---|---|
| 777,104 A | 12/1904 | Kahn |
| 790,612 A | 5/1905 | Boniface |
| 804,090 A | 11/1905 | Boeck |
| 804,184 A | 11/1905 | Boeck |
| 920,719 A | 5/1909 | Blasberg |
| 930,204 A | 8/1909 | Marsh et al. |
| 966,579 A | 8/1910 | Myers |
| 1,034,268 A | 7/1912 | McCord |
| 1,049,385 A | 1/1913 | Mohrenwitz |
| 1,155,519 A | 10/1915 | Shapland |
| 1,275,222 A | 8/1918 | Chamberlen |
| 1,377,092 A | 5/1921 | Phaneuf |
| 1,412,717 A | 4/1922 | Stowell |
| 1,630,237 A | 5/1927 | Smith |
| 1,948,778 A | 2/1934 | Zoia |
| 1,969,614 A | 8/1934 | Klopfenstein |
| 2,218,974 A | 10/1940 | Platt |
| 2,434,166 A | 1/1948 | Klumpp |
| 2,505,117 A | 4/1950 | Hoffman |
| 2,582,735 A | 1/1952 | Alaj |
| 2,767,297 A | 10/1956 | Benson |
| 2,864,932 A | 12/1958 | Forrer |
| 3,019,783 A | 2/1962 | Clarke |
| 3,098,924 A | 7/1963 | Salton et al. |
| 3,148,676 A | 9/1964 | Truog et al. |
| 3,830,148 A | 8/1974 | Shevlin |
| 3,875,370 A | 4/1975 | Williams |

(Continued)

*Primary Examiner*—Shawntina Fuqua
(74) *Attorney, Agent, or Firm*—Valauskas & Pine LLC

(57) ABSTRACT

An improved system and methods useful for the cooking of one or more food items by the application of a non-ambient temperature developed within a temperature retentive element. The temperature retentive element can be sized and shaped to form a cooking box in which cooking at a temperature relative to the non-ambient temperature may proceed and from which the food item, when fully cooked, may be served.

3 Claims, 7 Drawing sheets